US009871862B2

(12) United States Patent
Chakra et al.

(10) Patent No.: US 9,871,862 B2
(45) Date of Patent: *Jan. 16, 2018

(54) MANAGING OBJECT IDENTIFIERS BASED ON USER GROUPS

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 372 days.

This patent is subject to a terminal disclaimer.

(21) Appl. No.: 14/319,288

(22) Filed: Jun. 30, 2014

(65) Prior Publication Data

US 2015/0379151 A1    Dec. 31, 2015

(51) Int. Cl.
G06F 7/00       (2006.01)
H04L 29/08      (2006.01)
G06F 17/30      (2006.01)
G06Q 10/00      (2012.01)
G06F 21/62      (2013.01)

(52) U.S. Cl.
CPC ........ H04L 67/1097 (2013.01); G06F 17/301 (2013.01); G06F 17/3012 (2013.01); G06F 21/6218 (2013.01); G06Q 10/00 (2013.01)

(58) Field of Classification Search
CPC ......... G06F 17/30876; G06F 17/30864; G06F 17/30598

USPC .......................................................... 707/738
See application file for complete search history.

(56) References Cited

U.S. PATENT DOCUMENTS

| 8,281,404 | B2 | 10/2012 | Frey et al. |
|---|---|---|---|
| 9,154,502 | B2 | 10/2015 | Erb et al. |
| 9,336,276 | B2 | 5/2016 | Wilder et al. |
| 9,356,978 | B2 | 5/2016 | Chan et al. |
| 9,430,490 | B1 | 8/2016 | Lewis et al. |
| 2005/0232423 | A1* | 10/2005 | Horvitz .................. G06Q 10/10 380/255 |
| 2007/0198637 | A1* | 8/2007 | Deboy ................ H04L 65/4038 709/204 |
| 2008/0154949 | A1 | 6/2008 | Brooks et al. |
| 2010/0161592 | A1 | 6/2010 | Zhao |
| 2011/0179040 | A1 | 7/2011 | Bessonov et al. |

OTHER PUBLICATIONS

Accelerated Examination Support Document, U.S. Appl. No. 15/239,302, signed Aug. 15, 2016, 14 pgs.

(Continued)

*Primary Examiner* — Tony Mahmoudi
*Assistant Examiner* — Michael Le
(74) *Attorney, Agent, or Firm* — Christopher M. Coy (57) ABSTRACT

A method, system, and computer program product for managing an object related to a plurality of groups of users is disclosed. The method, system, and computer program product include utilizing identifiers of objects so that a requesting user can submit an object-request for access to the object utilizing a chosen identifier of the user. The method, system, and computer program product may work on a number of collaborative systems, file sharing mediums, or operating systems.

17 Claims, 5 Drawing Sheets

(56) References Cited

OTHER PUBLICATIONS

Chakra et al., "Managing Object Identifiers," U.S. Appl. No. 15/239,302, filed Aug. 17, 2016.
List of IBM Patents or Patent Applications Treated as Related, Aug. 16, 2016, 2 pgs.

* cited by examiner

MANAGING OBJECT IDENTIFIERS BASED ON USER GROUPS

BACKGROUND

This disclosure relates generally to computer systems and, more particularly, relates to managing object identifiers. The amount of data that needs to be managed by enterprises is growing at an extremely high rate. Management of environments with objects may need to be performed with as few errors as possible. As data needing to be managed increases, the need for management efficiency may increase.

SUMMARY

Aspects of the disclosure include receiving a first object-request from a first requesting user of a first user-group. The first object-request has a first identifier. The first identifier is used by at least the first user-group. The first identifier is configured to be based on an object-content description associated with the object. Aspects of the disclosure include storing the first identifier linked to at least the first user-group. The first identifier may be stored in a log associated with the object. The log can be configured to be searched by users.

Aspects of the disclosure include receiving a second object-request from a second requesting user of a second user-group. The second object-request has a second identifier different from the first identifier. The second identifier is used by at least the second user-group. The second identifier is configured to be based on the object-content description associated with the object. Aspects of the disclosure include storing the second identifier linked to at least the second user-group. The second identifier may be stored in the log associated with the object.

Aspects of the disclosure include receiving a third-object request from a third requesting user. The third object-request has a third identifier. The third identifier is configured to be based on the object-content description. Aspects of the disclosure include determining which of the plurality of groups of users the third requesting user belongs. To make the determination, the computer compares the third identifier with the first and second identifiers that are stored in the log. Aspects of the disclosure include determining whether the third identifier is to be stored in the log associated with the object. Aspects of the disclosure include sharing the object with the third requesting user.

DETAILED DESCRIPTION

Aspects of the disclosure include a method, system, and computer program product for managing object identifiers. Within an organization, a number of identifiers (e.g., reference terms, names, tags) may be used to describe a same object (e.g., file, document). The methodology utilizes identifiers of objects so that a requesting user can submit an object-request for access to the object utilizing a chosen identifier of the user (since different users sometimes refer to a same object by different identifiers).

For example, the system can ascertain when a document has an alternative name and adds a tag to the document (the tag being related to a specific user-group). The organization may formally identify the document according to in-house business rules while casually identifying the document based on a user perspective of document contents. As identification terminology evolves over time, aspects of the disclosure may have positive impacts on performance or efficiency associated with accurate identification of objects.

Aspects of the disclosure include a method, system, and computer program product for managing an object in a storage facility (i.e., storage system). The method, system, and computer program product may work on a number of collaborative systems, file sharing mediums, or operating systems (e.g., e-mails, instant messaging, file transfer protocol, wikis, forums). The method, system, and computer program product include managing an object related to a plurality of groups of users. The plurality of groups of users includes a first user-group and a second user-group.

Aspects of the disclosure include receiving (by a computer) a first object-request from a first requesting user of a first user-group. The first object-request has a first identifier. The first identifier is used by at least the first user-group. The first identifier is configured to be based on an object-content description associated with the object. Aspects of the disclosure include storing (by the computer) the first identifier linked to at least the first user-group. The first identifier may be stored in a log associated with the object. The log can be configured to be searched by users.

Aspects of the disclosure include receiving (by the computer) a second object-request from a second requesting user of a second user-group. The second object-request has a second identifier (the second identifier different from the first identifier). The second identifier is used by at least the second user-group. The second identifier is configured to be based on the object-content description associated with the object. Aspects of the disclosure include storing (by the computer) the second identifier linked to at least the second user-group. The second identifier may be stored in the log associated with the object (the log being searchable).

Aspects of the disclosure include receiving (by the computer) a third-object request from a third requesting user. The third object-request has a third identifier. The third identifier is configured to be based on the object-content description. Aspects of the disclosure include determining which of the plurality of groups of users the third requesting user belongs (e.g., the third requesting user belongs to the second user-group). To make the determination, the computer compares the third identifier with the first and second identifiers that are stored in the log (e.g., for user-group or object-content description). In embodiments, an alert may be triggered/presented/transmitted/sent in response to an ambiguity threshold level being reached by not being able to determine which of the plurality of groups of users the third requesting user belongs (e.g., the comparison yields similar but not identical features).

Aspects of the disclosure include determining whether the third identifier is to be stored in the log associated with the object. In embodiments, the third identifier is stored in the log associated with the object in response to absence of the third identifier in the log (e.g., if the third identifier is not in the log then store the third identifier in the log). Aspects of the disclosure include sharing (by the computer) the object with the third requesting user (e.g., transmitting/sending the object). In embodiments, a fourth object-request having a fourth identifier is received (by the computer) from a fourth requesting user. It may be determined that the fourth identifier is not linked to the object-content description (by comparing the fourth identifier with the first and second identifiers stored in the log). Accordingly, the object may be withheld (by the computer) from being shared with the fourth requesting user. In specific embodiments, a host of the object may be notified that the object has been withheld from the fourth requesting user.

In embodiments, the third identifier is used by at least a third user-group of the plurality of groups of users. It may be determined that the third requesting user belongs to the third user-group. The third identifier linked to at least the third user-group can be stored (in the log). In particular embodiments, the third user-group can include both the first user-group and the second user-group (e.g., the third user-group may be a global user-group). In various embodiments, the third identifier is used by at least the second user-group of the plurality of groups of users. It may be determined that the third requesting user belongs to the second user-group. The third identifier linked to at least the second user-group can be stored (in the log) (similarly, the third identifier may be used by at least the first user-group).

In embodiments, the third object-request is scanned (by the computer) for keywords and alternative identifiers for the object based on the object-content description. According to such embodiments, a natural language processor may be provided to identify parts-of-speech or keywords used in the third object-request. In embodiments, an alternative identifier (e.g., different name) for the object may be presented (for selection by the third requesting user) and the alternative identifier can be stored in a manner linking it to at least the third user-group. In embodiments, it may be determined from/using a plurality of business cards contained in an authentication server that the third requesting user belongs to the first user-group (or the second user-group). Aspects of the disclosure provide a methodology for managing an object related to a plurality of groups of users in a storage system that may provide performance or efficiency benefits for users of the storage system.

Figure 1:
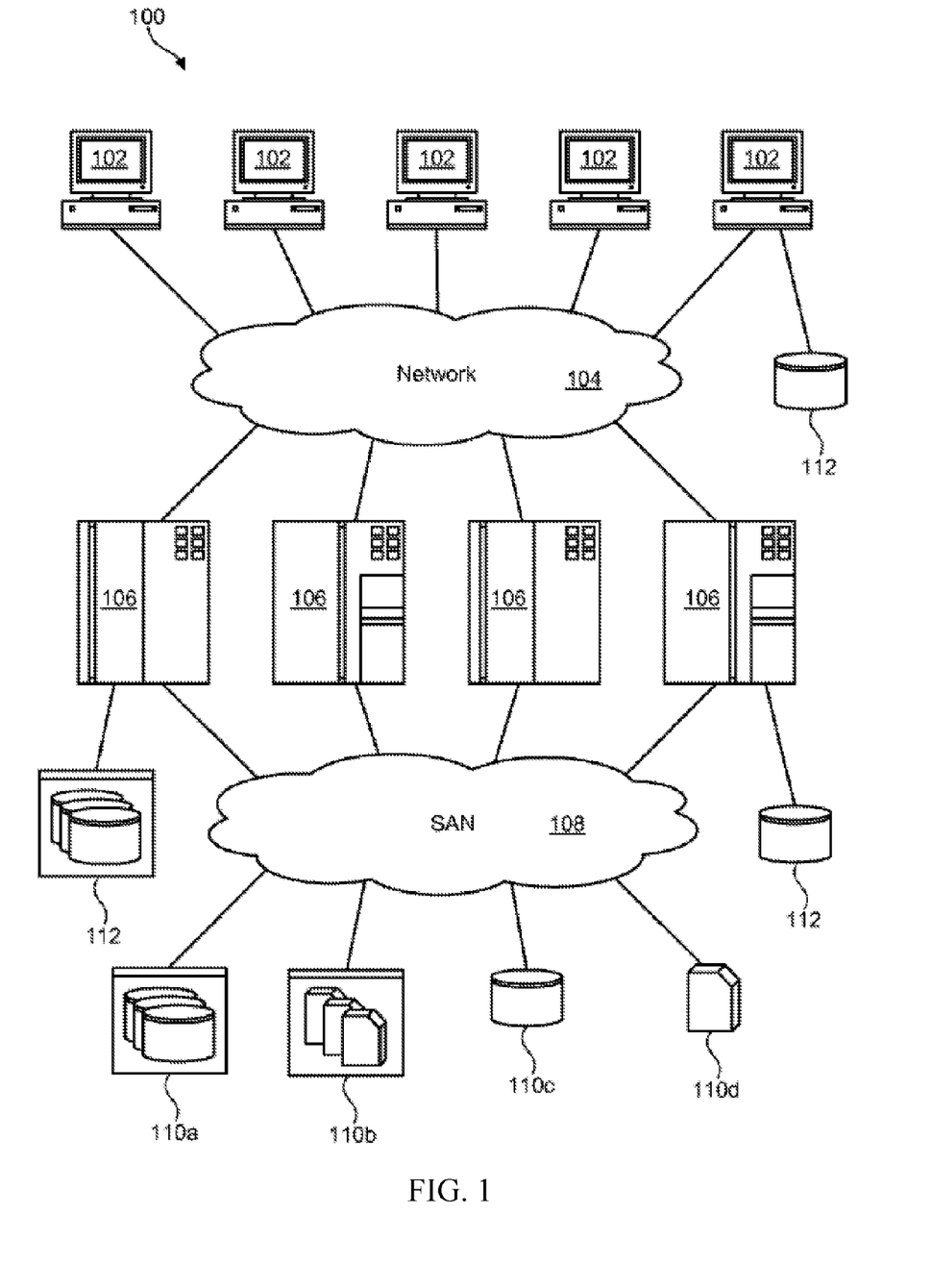
FIG. 1 illustrates an example network architecture according to embodiments.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may permit the storage pools of storage systems 110, 112 to identify objects. Therefore, the methodology provided may allow for performance or efficiency benefits when sharing objects in relation to the example network architecture 100 illustrated by FIG. 1.

Figure 2:
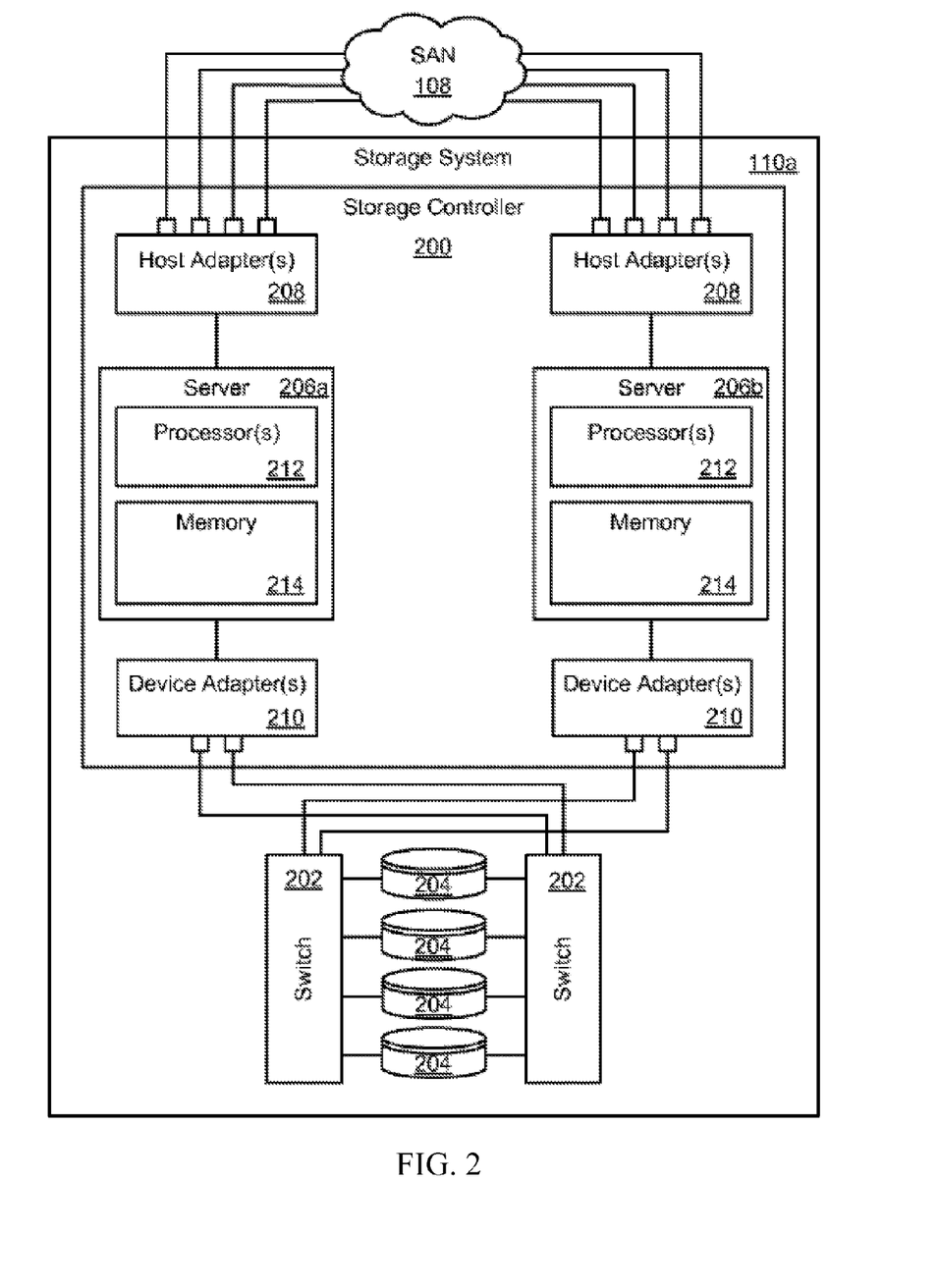
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may permit the storage devices 204 to identify objects. Therefore, the methodology provided may allow for performance or efficiency benefits when sharing objects in relation to the example storage system 110*a* containing an array of storage devices 204 illustrated by FIG. 2.

Figure 3:
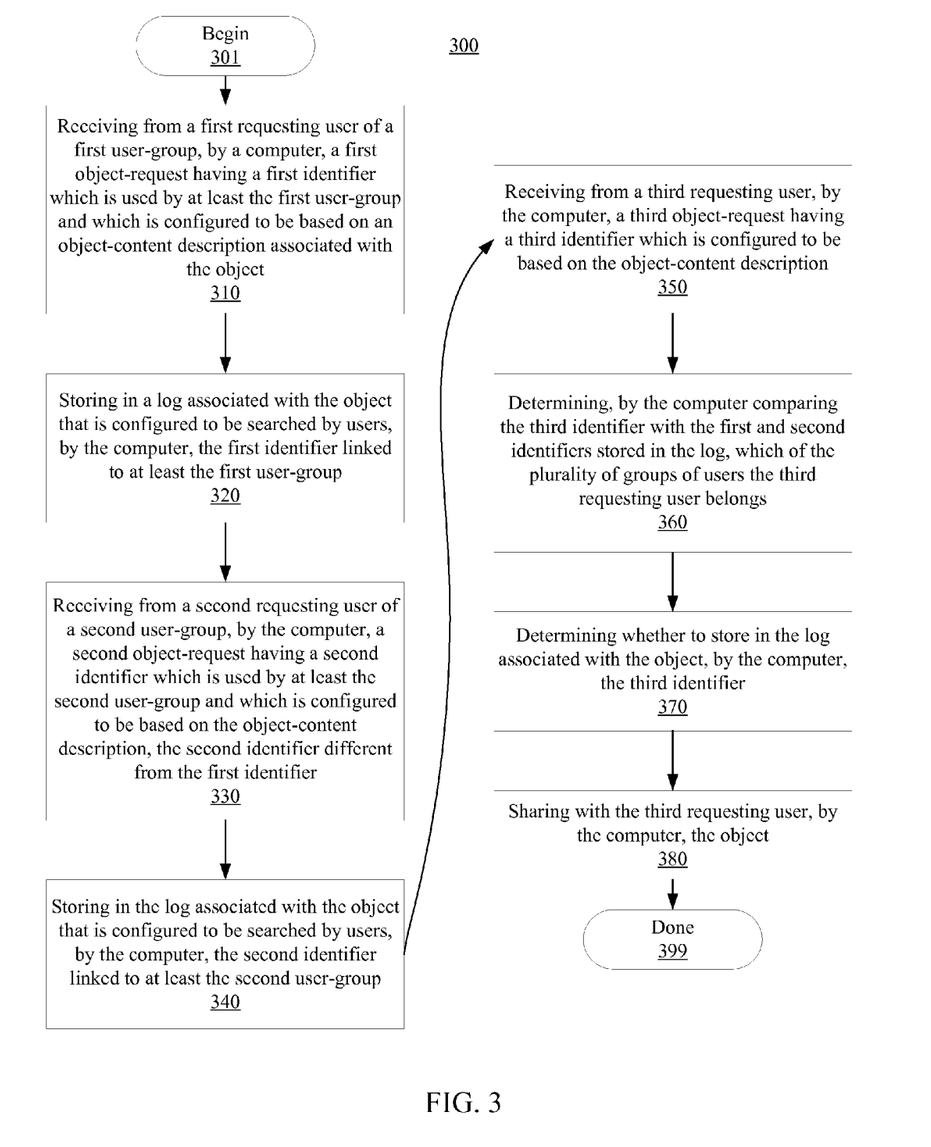
FIG. 3 is a flowchart illustrating a method for managing an object in a storage system according to embodiments.

FIG. 3 is a flowchart illustrating a method 300 for managing an object in a storage system according to embodiments. The method 300 includes managing the object related to a plurality of groups of users in a collaborative storage system or file sharing medium. The plurality of groups of users includes a first user-group and a second user-group (and can include a third user-group, etc.). Method 300 may begin at block 301.

At block 310, a first object-request is received (by a computer) from a first requesting user (e.g., John Doe's computer) of a first user-group (e.g., corporate accounting). The first object-request has a first identifier (e.g., the books). The first identifier is used by at least the first user-group (e.g., it is used by corporate accounting but may also be used by others such as internal audit). The first identifier is configured to be based on an object-content description (e.g., first quarter transactions) associated with the object (e.g., <filename>).

At block 320, the first identifier is stored (by the computer) linked to at least the first user-group (e.g., a multi-dimensional array couples the first identifier with the first user-group). The first identifier may be stored in a log associated with the object (e.g., captured in a repository with other meta data collected for the object). The log can be configured to be searched by users (e.g., a meta data search module).

At block 330, a second object-request is received (by a computer) from a second requesting user (e.g., Mary Smith's computer) of a second user-group (e.g., business development management). The second object-request has a second identifier (e.g., the master). The second identifier is used by at least the second user-group (e.g., it is used by business development management but may also be used by others such as internal audit or corporate accounting). The second identifier is configured to be based on the object-content description (e.g., first quarter transactions) associated with the object.

At block 340, the second identifier is stored (by the computer) linked to at least the second user-group (e.g., a multi-dimensional array couples the second identifier with the second user-group). The second identifier may be stored in the log associated with the object (e.g., captured in a repository with other meta data collected for the object). The log can be configured to be searched by users (e.g., a find mechanism in the log).

At block 350, a third-object request is received (by the computer) from a third requesting user (e.g., userN). The third object-request has a third identifier (e.g., the papers, the master-book, the 1Q-master). The third identifier is configured to be based on the object-content description (e.g., first quarter transactions).

At block 360, which of the plurality of groups of users the third requesting user belongs is determined (e.g., the third requesting user belongs to the second user-group such as business development management). To make the determination, the computer compares the third identifier with the first and second identifiers that are stored in the log (e.g., for user-group or object-content description). For example, "the papers" is compared with "the books" and "the master." In other examples, "the master-book" is compared with "the books" and "the master" or "the 1Q-master" is compared with "the books" and "the master." Embodiments including still images, audio, video, or values other than letters/words are also considered (e.g., comparing identifiers of pictures of animals or fruit).

In embodiments, an alert may be triggered/presented/transmitted/sent in response to an ambiguity threshold level being reached by not being able to determine which of the plurality of groups of users the third requesting user belongs (e.g., the comparison yields similar but not identical features). For instance, "the master-book" may be sufficiently ambiguous to place it in one or both of the groups when compared with "the books" and "the master". Ambiguity threshold level may be set at a predetermined level requiring a sequence of letters/words to match.

At block 370, whether the third identifier is to be stored in the log associated with the object is determined. In embodiments, the third identifier is stored in the log associated with the object in response to absence of the third identifier in the log (e.g., if the third identifier is not in the log then store the third identifier in the log). For example, if the third identifier is "the papers" and "the papers" is not found in the log, then "the papers" is stored in the log.

At block 380, the object is shared (by the computer) with the third requesting user (e.g., transmitting/sending the object). In embodiments, a fourth object-request having a fourth identifier (e.g., the code) is received (by the computer) from a fourth requesting user (e.g., userP). It may be determined that the fourth identifier is not linked to the object-content description (by comparing the fourth identifier with the first and second identifiers stored in the log). Accordingly, the object may be withheld (by the computer) from being shared with the fourth requesting user. In specific embodiments, a host of the object may be notified that the object has been withheld from the fourth requesting user (e.g., the host gets notified userP sought "the code" but was denied access).

In embodiments, the third identifier (e.g., the papers) is used by at least a third user-group (e.g., corporate finance) of the plurality of groups of users. It may be determined that the third requesting user belongs to the third user-group. The third identifier linked to at least the third user-group can be stored (in the log). In particular embodiments, the third user-group can include both the first user-group and the second user-group (e.g., the third user-group may be a global user-group with an example including "corporate accounting" and "business development management" both being part of "global business"). In various embodiments, the third identifier is used by at least the second user-group of the plurality of groups of users. It may be determined that the third requesting user (e.g., userN) belongs to the second user-group (e.g., business development management). The third identifier linked to at least the second user-group can be stored (in the log) (similarly, the third identifier may be used by at least the first user-group).

In embodiments, the third object-request is scanned (by the computer) for keywords and alternative identifiers for the object based on the object-content description. For example, based on an object-content description of "first quarter transactions" keywords such as "first," "first quarter," or "deals" may be scanned/searched for. Likewise, alternative identifiers such as "1Q," "books," or "master transaction list" may be scanned/searched for. According to such embodiments, a natural language processor may be provided to identify parts-of-speech or keywords used in the third object-request. In embodiments, an alternative identifier (e.g., different name) for the object may be presented (for selection by the third requesting user) and the alternative identifier can be stored in a manner linking it to at least the third user-group. In embodiments, it may be determined from/using a plurality of business cards (e.g., having titles, usernames, reporting chains, groupings, or identification values) contained in an authentication server that the third requesting user belongs to the first user-group (or the second user-group).

Method 300 may conclude at block 399. Aspects of method 300 may provide performance or efficiency benefits when managing an object related to a plurality of groups of users in a storage system.

Figure 4:
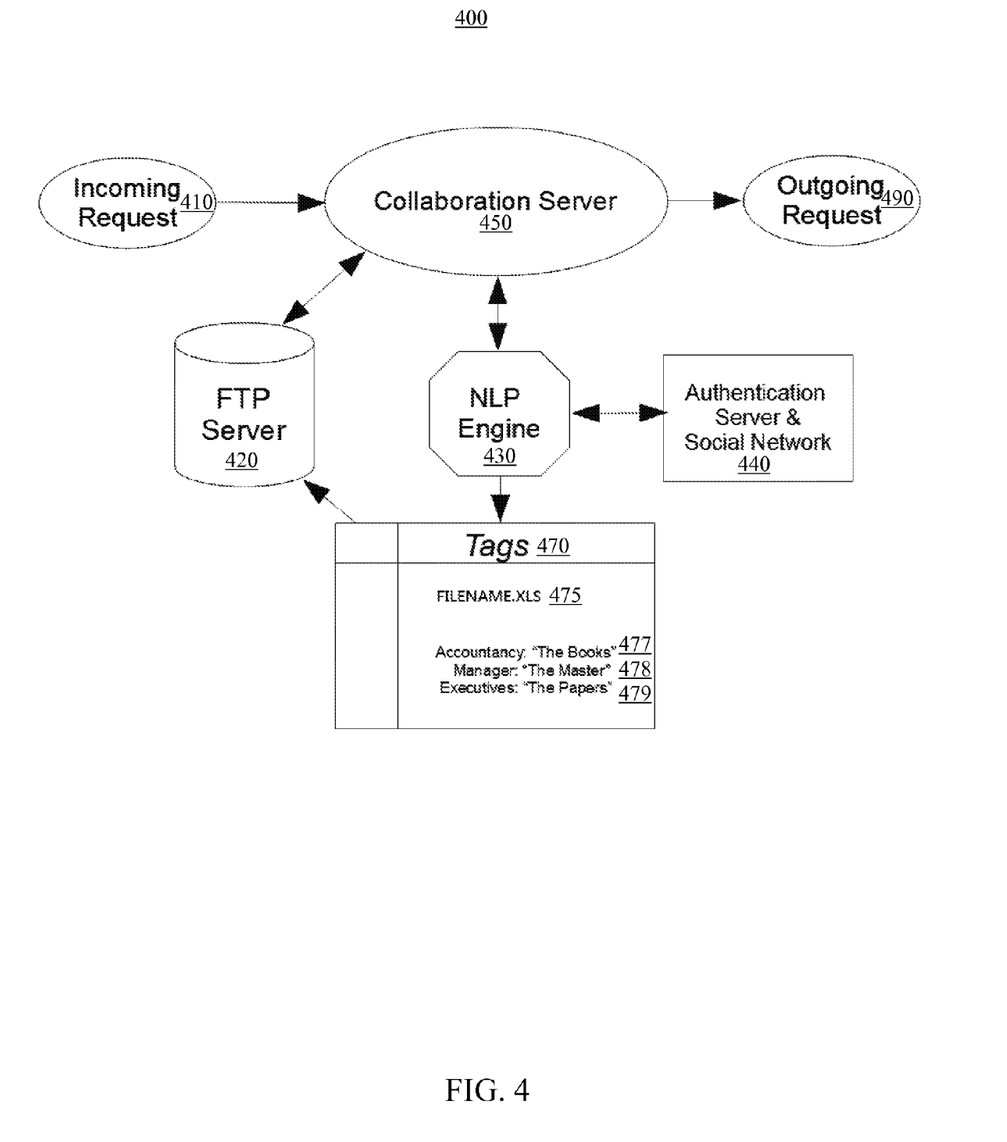
FIG. 4 depicts an example storage system according to embodiments.

FIG. 4 depicts an example storage system 400 according to embodiments. The system operates, for example in embodiments, by monitoring the requesting and sharing of objects over a network. For example, if UserA works for accountancy and has requested "The Books" from UserB who also works in accountancy over email or instant messaging, then the system using a Natural Language Processor can identify the keyword (or tag) that was used to request (or describe) the object/file. Over time, the system can familiarize itself with the keyword related to the document and then enable a popup for UserA or UserB to confirm this in fact is an accountancy-group term for a particular document.

The system may also strive to learn the latest terminology for each document, so that when new generation of users start requesting the document, the system can keep up-to-date with fresh identifying conventions. Once the document is passed to another social area such as "The Executives," the system may determine from business cards contained in the authentication server 440 that this is a different business area, that the document is called "The Papers" 479 in such business area, and offer the recipient the same opportunity to tag the document for that social/business area. Ultimately, internal database search results when looking for documents can be positively influenced for performance or efficiency (including offering users options to add local identifiers for objects/documents).

To illustrate, a collaboration server 450 can receive an incoming request 410 from UserA to UserB for "The Papers" 479. A Natural Language Processor 430 may scan the incoming request 410 for keywords and alternative names. The system may input the given user credentials and check logs for relationships between the keywords requesting the file "FILENAME.XLS" 475 from previous requests for previous versions of the same document. The system may send a request to the end user to confirm the tag 470 for that social area and, after doing so, can add the tag to the file contained within the file transfer protocol (ftp)/storage server 420. An outgoing request 490 may be issued with a tag such as the books 477, the master 478, or the papers 479 based on the appropriate identifier.

Figure 5:
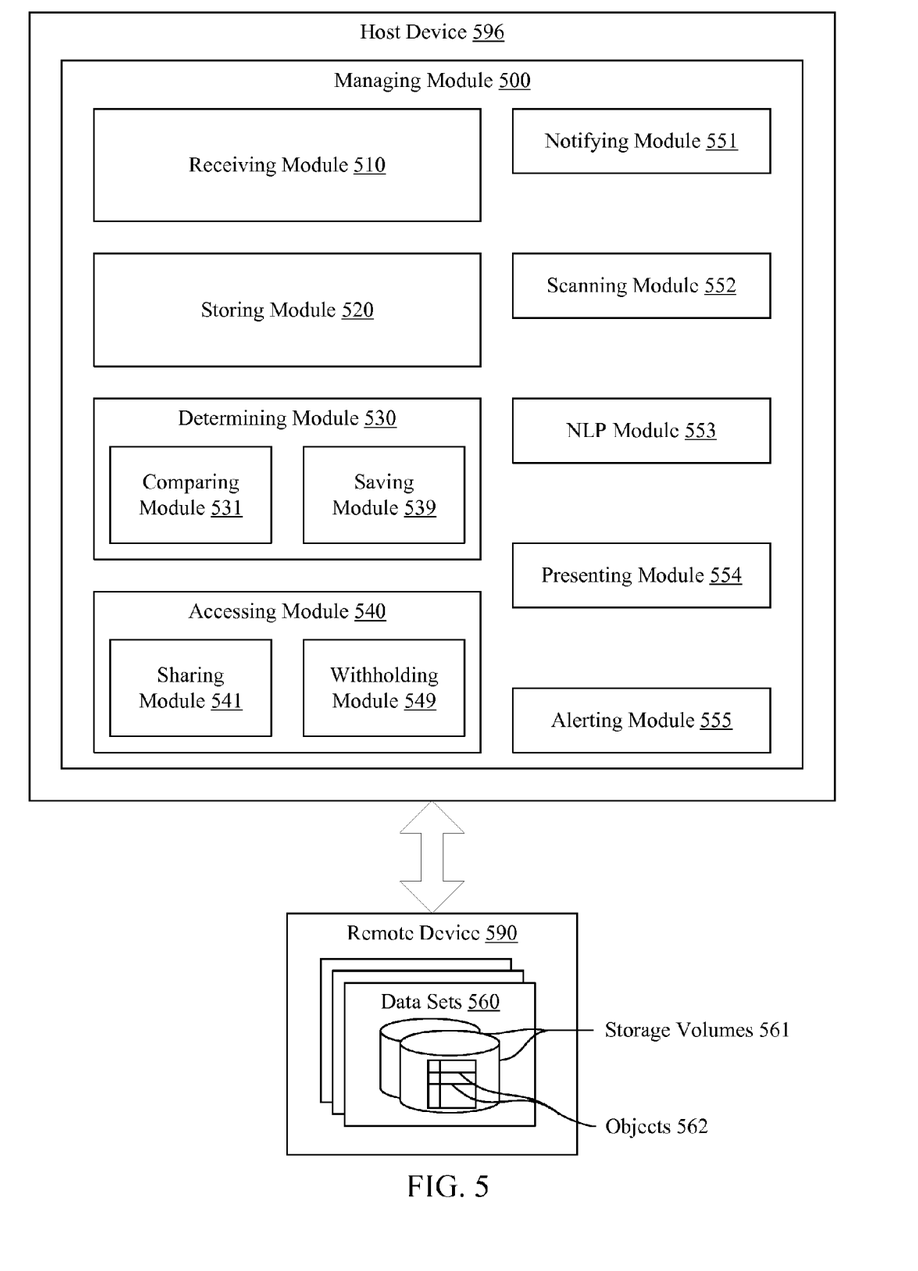
FIG. 5 shows modules of a system for managing a storage facility according to embodiments.

FIG. 5 shows modules of a system for managing a storage facility according to embodiments. In embodiments, method 300 may be implemented using one or more modules of FIG. 5. These modules may be implemented in hardware, software or firmware executable on hardware, or a combination thereof. For example, module functionality that may occur in a host device 596 may actually be implemented in a remote device 590 and vice versa. Other functionality may be distributed across the host device 596 and the remote device 590.

The host device 596 may include a managing module 500. The managing module 500 may be configured and arranged to manage a storage facility. The managing module 500 may manage an object related to a plurality of groups of users in a collaborative storage system or file sharing medium. The plurality of groups of users includes a first user-group and a second user-group (and can include a third user-group, etc.). The managing module 500 may include an receiving module 510, a storing module 520, a determining module 530 (having a comparing module 531 and a saving module 539), an accessing module 540 (having a sharing module 541 and a withholding module 549), a notifying module 551, a scanning module 552, an NLP module 553, a presenting module 554, and an alerting module 555. The remote device 590 may have data sets 560 comprising storage volumes 561 having objects 562.

The receiving module 510 receives object-requests from requesting users of user-groups. The object-requests have identifiers. A particular identifier is used by at least a particular user-group. The particular identifier is configured to be based on an object-content description associated with a particular object. The storing module 520 stores identifiers linked user-groups. The identifiers may be stored in a log associated with the object. The log can be configured to be searched by users.

The determining module 530 determines which of the plurality of groups of users the third requesting user belongs. To make the determination, the comparing module 531 may be used to compare a received identifier with saved/stored identifiers that are stored in the log. The determining module 530 determines whether the received identifier is to be saved/stored (using the saving module 539) in the log associated with the object. In embodiments, the received identifier is saved/stored in the log associated with the object in response to absence of the received identifier in the log. In embodiments, the alerting module 555 may trigger/present/transmit/send an alert in response to an ambiguity threshold level being reached by not being able to determine which of the plurality of groups of users the third requesting user belongs.

The accessing module 540 may share the object with a requesting user using the sharing module 541. When it is not appropriate to share the object, the withholding module 549 may withhold the object from being shared. In specific embodiments, a host of the object may be notified using the notifying module 551 that the object has been withheld. In embodiments, object-requests are scanned (using the scanning module 552) for keywords and alternative identifiers for the object based on the object-content description. In embodiments, a natural language processor may be utilized (using the NLP module 553) to identify parts-of-speech or keywords used in the object-requests. In embodiments, an alternative identifier for the object may be presented (using the presenting module 554) and the alternative identifier can be stored in a manner linking it to one or more user-groups. Aspects of managing module 500 may provide performance or efficiency benefits when managing an object related to a plurality of groups of users. Altogether, a storage facility may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method for managing an object related to a plurality of groups of users including a first user-group and a second user-group, the method comprising:

receiving from a first requesting user of the first user-group, by a computer, a first object-request having a first identifier which is used by at least the first user-group and which is configured to be based on an object-content description associated with the object;

storing in a log associated with the object that is configured to be searched by users, by the computer in response to receiving the first object-request, the first identifier linked to at least the first user-group;

receiving from a second requesting user of the second user-group, by the computer, a second object-request having a second identifier which is used by at least the second user-group and which is configured to be based on the object-content description, the second identifier different from the first identifier;

storing in the log associated with the object that is configured to be searched by users, by the computer in response to receiving the second object-request, the second identifier linked to at least the second user-group;

receiving from a third requesting user, by the computer, a third object-request having a third identifier which is configured to be based on the object-content description;

determining, in response to receiving the third object-request, by the computer comparing the third identifier with the first and second identifiers stored in the log, which of the plurality of groups of users the third requesting user belongs;

sending an alert in response to an ambiguity threshold level being reached by not being able to determine which of the plurality of groups of users the third requesting user belongs, wherein the ambiguity threshold is reached when both a first threshold is satisfied for the first user group and a second threshold is satisfied for the second user group;

determining, based on the comparison of the third identifier with the first and second identifiers, whether to store in the log associated with the object, by the computer, the third identifier; and sharing, based on determining to store the third identifier in the log, with the third requesting user, by the computer, the object;

receiving from a fourth requesting user, by the computer, a fourth object-request having a fourth identifier;

determining, in response to receiving the fourth object-request, by the computer comparing the fourth identifier with the first, second, and third identifiers stored in the log, the fourth identifier is not linked to the object-content description; and withholding, based on the comparison of the fourth identifier with the first, second, and third identifiers, by the computer, the object from being shared with the fourth requesting user.

2. The method of claim 1, further comprising:

determining, based on the comparison of the third identifier with the first and second identifiers, that the third requesting user belongs to a third user-group of the plurality of groups of users, wherein the third identifier is used by at least the third user-group; and storing in the log, in response to determining that the third requesting user belongs to the third user-group, the third identifier linked to at least the third user-group, wherein differences in terminology used by members of first user-group, the second user-group, and the third user-group to describe the object causes the first identifier, the second identifier, and the third identifier to be different from each other.

3. The method of claim 1, further comprising:
determining, based on the comparison of the third identifier with the first and second identifiers, that the third requesting user belongs to the second user-group of the plurality of groups of users, wherein the third identifier is used by at least the second user-group; and
storing in the log, in response to determining that the third requesting user belongs to the second user-group, the third identifier linked to at least the second user-group, wherein the first identifier is a name of the object that is based on terminology used by members of the first user group to identify the object, and wherein the second and third identifiers are names of the object that are based on terminology used by members of the second user group to identify the object.

4. The method of claim 1, wherein determining whether to store in the log associated with the object, by the computer, the third identifier includes:
storing in the log associated with the object, by the computer, the third identifier in response to absence of the third identifier in the log associated with the object.

5. The method of claim 2, wherein the third user-group includes both the first user-group and the second user-group.

6. The method of claim 1, further comprising notifying a host of the object that the object has been withheld from the fourth requesting user.

7. The method of claim 1, further comprising scanning the third object-request, by the computer, for keywords and alternative identifiers for the object based on the object-content description.

8. The method of claim 7, further comprising providing a natural language processor to identify keywords used in the third object-request.

9. The method of claim 1, further comprising presenting an alternative identifier for the object for selection by the third requesting user and storing the selected alternative identifier linked to at least the third user-group.

10. The method of claim 1, further comprising determining from a plurality of business cards contained in an authentication server that the third requesting user belongs to the first user-group.

11. A system for managing an object related to a plurality of groups of users including a first user-group and a second user-group in a storage facility, comprising:
a hardware processor; and
a non-transitory computer-readable storage medium having program instructions embodied therewith, the program instructions executable by the hardware processor cause the system to:
receive from a first requesting user of the first user-group a first object-request having a first identifier which is used by at least the first user-group and which is configured to be based on an object-content description associated with the object,
receive from a second requesting user of the second user-group a second object-request having a second identifier which is used by at least the second user-group and which is configured to be based on the object-content description, the second identifier different from the first identifier;
store, in response to receiving the first object-request and the second object-request, in a log associated with the object that is configured to be searched by users, the first identifier linked to at least the first user-group and the second identifier linked to at least the second user-group;
receive from a third requesting user a third object-request having a third identifier which is configured to be based on the object-content description;
determine, in response to receiving the third object-request, by comparing the third identifier with the first and second identifiers stored in the log, which of the plurality of groups of users the third requesting user belongs;
send an alert in response to an ambiguity threshold level being reached by not being able to determine which of the plurality of groups of users the third requesting user belongs, wherein the ambiguity threshold is reached when both a first threshold is satisfied for the first user group and a second threshold is satisfied for the second user group;
determine, based on the comparison of the third identifier with the first and second identifiers stored in the log, whether to store in the log associated with the object the third identifier; and
share, based on determining to store the third identifier in the log, with the third requesting user the object;
receive from a fourth requesting user a fourth object-request having a fourth identifier;
determine, by comparing the fourth identifier with the first, second, and third identifiers stored in the log, the fourth identifier is not linked to the object-content description; and
withhold the object from being shared with the fourth requesting user.

12. The system of claim 11, wherein the program instructions further cause the system to:
determine, based on the comparison of the third identifier with the first and second identifiers in the log, that the third requesting user belongs to a third user-group of the plurality of groups of users, wherein the third identifier is used by at least the third user-group; and
store, in the log associated with the object, the third identifier linked to at least the third user-group in response to absence of the third identifier in the log associated with the object.

13. The system of claim 11, wherein the program instructions further cause the system to notify a host of the object that the object has been withheld from the fourth requesting user.

14. The system of claim 13, wherein the program instructions further cause the system to scan the third object-request for keywords and alternative identifiers for the object based on the object-content description.

15. The system of claim 14, wherein the program instructions further cause the system to utilize a natural language processor to identify keywords used in the third object-request.

16. The system of claim 15, wherein the program instructions further cause the system to determine, from a plurality of business cards contained in an authentication server, that the third requesting user belongs to the first user-group.

17. A computer program product for managing an object related to a plurality of groups of users including a first user-group and a second user-group in a storage facility, the computer program product comprising a non-transitory computer readable storage medium having program instructions embodied therewith, the program instructions executable by a computer to perform a method comprising:
receiving, from a first requesting user of the first user-group, a first object-request having a first identifier associated with a first user-group that is configured to be based on an object-content description associated with the object, wherein the first identifier includes one or more keywords;

storing, in response to receiving the first object-request, the first identifier linked to the first user-group in a log associated with the object that is configured to be searched by users;

receiving, from a second requesting user of the second user-group, a second object-request having a second identifier associated with the second user-group that is configured to be based on the object-content description, wherein the second identifier includes one or more keywords;

storing, in response to receiving the second object-request, the second identifier linked to at least the second user-group in the log;

receiving, from a third requesting user, a third object-request having a third identifier that is configured to be based on the object-content description, wherein the third identifier includes one or more keywords;

determining, in response to receiving the third object-request, by comparing, utilizing a natural language processor (NLP), the one or more keywords of the third identifier with the one or more keywords of the first identifier and the one or more keywords of the second identifier, which of the plurality of groups of users the third requesting user belongs;

sending an alert in response to an ambiguity threshold level being reached by not being able to determine which of the plurality of groups of users the third requesting user belongs, wherein the ambiguity threshold is reached when both a first threshold is satisfied for the first user group and a second threshold is satisfied for the second user group;

determining, based on the comparison of the third identifier with the first identifier and the second identifier and on the utilizing the NLP, that the one or more keywords of the third identifier are not similar to the one or more keywords of the first identifier or the one or more keywords of the second identifier;

determining, in response to determining that the one or more keywords of the third identifier are not similar to the one or more keywords of the first identifier or the one or more keywords of the second identifier, to store the third identifier in the log associated with the object; and sharing, based on determining to store the third identifier in the log, the object with the third requesting user;

receiving from a fourth requesting user, a fourth object-request having a fourth identifier, wherein the fourth identifier includes one or more keywords;

determining, in response to receiving the fourth object-request, by comparing, utilizing the NLP, the one or more keywords of the fourth identifier with the one or more keywords of each of the first, second, and third identifiers stored in the log, the fourth identifier is not linked to the object-content description; and withholding, based on the comparison of the fourth identifier with the first, second, and third identifiers, the object from being shared with the fourth requesting user.

* * * * *